April 30, 1963  C. BARASSI ET AL  3,087,526
PNEUMATIC TIRE WITH SEPARATE TREAD RINGS
Filed July 10, 1961  2 Sheets-Sheet 1

PRIOR ART →

INVENTORS
CARLO BARASSI
ARRIGO CEGNAR
GIULIO CAPPA
BY
ATTORNEYS

April 30, 1963

C. BARASSI ET AL 3,087,526

PNEUMATIC TIRE WITH SEPARATE TREAD RINGS

Filed July 10, 1961

INVENTORS
CARLO BARASSI,
ARRIGO CEGNAR,
GIULIO CAPPA

BY *Stevens, Davis, Miller & Mosher*
ATTORNEYS

United States Patent Office 3,087,526
Patented Apr. 30, 1963

3,087,526
PNEUMATIC TIRE WITH SEPARATE
TREAD RINGS
Carlo Barassi, Giulio Cappa, and Arrigo Cegnar, all of
Milan, Italy, assignors to Pirelli S.p.A., Milan, Italy
Filed July 10, 1961, Ser. No. 122,786
Claims priority, application Italy Aug. 2, 1960
4 Claims. (Cl. 152—176)

The present invention relates to a vehicle tire of the pneumatic type wherein the tread portion is removable from the carcass. More particularly, this invention relates to a tire of the above type wherein the removable tread portion constitutes a plurality of individual rubber tread rings, these tread rings being integrally joined to one another by rubber links or bridges as will hereinafter appear.

It is old to provide a pneumatic tire with a plurality of separate and independent tread rings, as described in U.S. Patent No. 2,990,867. In the aforementioned patent, the separate tread rings are disposed parallel to one another and are provided on their outer peripheral surfaces with tread patterns formed by suitably disposed grooves and ridges. Each of the rings, in the region adjacent its inner periphery, is provided with an annular reinforcing structure which is substantially inextensible in the longitudinal direction and which is placed under tension by the inflation pressure of the tire.

The carcass of the aforementioned patent is provided, along its outer periphery, with a plurality of parallel spaced longitudinal ridges with intervening spaces forming suitable longitudinal grooves in which the tread rings are received. The carcass is designed to permit small lonitudinal movements of the tread, and, therefore, is preferably of the radial type; that is, the carcass plies are formed of wires or cords lying in radial planes, the latter passing through the rotational axis of the tire, or in planes forming relatively small angles with such radial planes.

Tires of the type described above insure highly acceptable performance as regards service life, road-holding capabilities, easy steerage, smooth riding, and the elimination of noise on curves. However, since the tread is divided into separate and independent rings, there are limitations imposed upon the selection of a suitable tread pattern. Generally speaking, the tread in its entirety is constituted by a plurality of grooves and ridges suitably proportioned and disposed in predetermined relative positions. The relative positions of the grooves and ridges will, in many instances, have a critical effect upon the life of the tire, its road-holding capabilities and, above all, the silent riding of the vehicle.

Therefore, in tires of the above type, a portion of the tread, namely one ring, can be assembled in various positions with respect to another portion of the tread, namely another ring. In some tread patterns, this variation can create a significant difference in appearance of the overall pattern itself, as can be seen from a comparison of FIGURES 1 and 2 of the attached drawings. On the other hand, with certain tread patterns, the maximum admissible displacement should not exceed the value of a few millimeters, so that it is difficult to assemble the rings on the carcass in such a manner as to comply with these limitations. For these reasons, the construction of tires of the above type has generally involved the selection of a tread pattern in which the mutual positions of the rings is not critical.

In accordance with the present invention, the individual rings are connected to one another by annular bridges whose distance from the inner surface of the rings is equal to the height of the longitudinal ridges on the carcass. These bridges are flexible so that the rings, in operation, behave in substantially the same way as if they were not connected, thereby maintaining all of the advantages of the tire described above. On the other hand, since the rings are integrally interconnected by these bridges, it is possible to assemble the rings on the carcass in such a manner that the predetermined configuration of the tread pattern is maintained without any undesirable displacement.

Therefore, it is a principal object of the present invention to provide a tire of the type described above wherein the individual rings are integrally connected to one another by annular bridges so as to insure the continued maintenance of the predetermined configuration of the overall tread pattern.

Other and further objects and advantageous features of the present invention will hereinafter more fully appear in connection with a detailed description of the present drawings in which.

Figure 1:
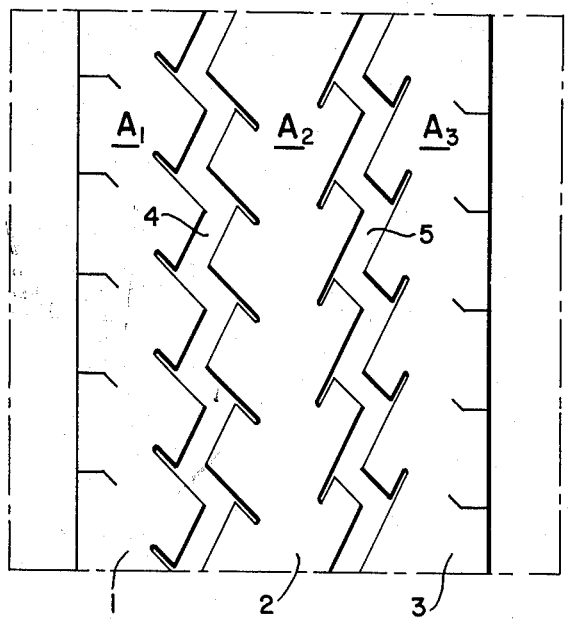
FIGURE 1 is a view, developed in plane, of a tread pattern formed by the tread rings of the present invention and having a generally desirable resulting configuration.

Referring to the drawings in detail, reference numerals 1, 2 and 3 in FIGURE 1 indicate the independent rings, respectively, forming the tread. These rings, as far as the present invention is concerned, form a tread pattern which will be maintained as such by virtue of the interconnecting bridges, later to be described. As far as the separate treads of the type described in U.S. Patent No. 2,990,867 are concerned, these separate tread rings should be arranged in the desired relative positions such that the reference lines $A_1$, $A_2$ and $A_3$ would be in alignment as shown in FIGURE 1. Thus, the grooves 4 and 5 have essentially the same zig-zag pattern as shown in this figure.

Figure 2:
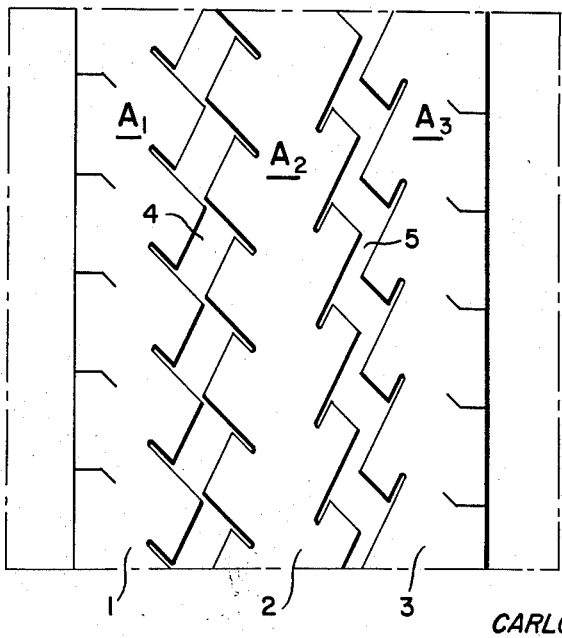
FIGURE 2 is a view, developed in plane, showing a tread pattern similar to FIGURE 1 formed by three separate tread rings of the prior art and wherein the central ring has been displaced so as to form a generally undesirable overall configuration.

FIGURE 2 represents the same rings 1, 2 and 3 constructed in accordance with the teachings of the aforementioned patent and assembled in such a way that the reference line $A_2$ of the central ring 2 is offset with respect to reference lines $A_1$ and $A_3$. In this condition, the groove 4 assumes the shape of a series of independent cavities of rectangular configuration whereas the groove 5 assumes an irregular zig-zag shape different from that of FIGURE 1.

A comparison of FIGURE 1 with FIGURE 2 shows that the displacement of one separate ring with respect to another (or the others) will make a substantial change in the appearance of the overall tread pattern.

Figure 3:
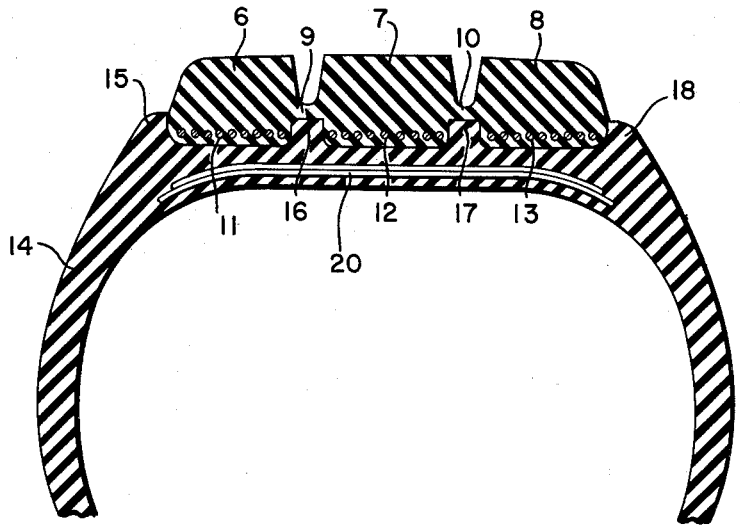
FIGURE 3 is a semi-diagrammatic sectional view taken on a transverse section through a tire of the present invention.

FIGURE 3 illustrates the present invention wherein three rings, 6, 7 and 8 form a separate tread. These three tread rings are integrally connected to one another by annular rubber bridges 9 and 10 and each tread ring portion is provided with reinforcing structures such as 11, 12 and 13, the latter being inextensible in the longitudinal direction and being disposed in close proximity to the radially innermost portion of each ring. The reinforcing structures are made from materials having low elongation properties and can be formed by one or more layers of cords wound helically in a prevailingly longitudinal direction; alternatively, these reinforcing structures can be formed by two or more layers of cords where the cords are parallel in each layer and are inclined at a small angle to the mid-circumferential plane of the tire, the cords of one layer being crossed with respect to the cords of the other layers. The rings 6, 7 and 8 are assembled on a carcass 14 which is provided with longitudinal ridges 15, 16, 17 and 18, these ridges, forming between each adjacent pair, the grooves in which the rings are received. The thickness of the bridges 9 and 10 is preferably not greater than the height of the longitudinal ridges 16 and 17.

The carcass 14 has such a shape that, if it were inflated without the tread rings, the bottom surfaces of the grooves, in which the rings would be otherwise received, would assume diameters greater than the inner diameters of the rings themselves.

As indicated heretofore, the carcass is preferably of the radial type, namely, one in which the cords have a radial or essentially radial path. Preferably, the carcass is also provided with a breaker strip 20 comprising layers of cords inclined with respect to the mid-circumferential plane of the tire at angles ranging between 35° and 60°. The cords in each layer are parallel to one another but are crossed with respect to the cords of an adjacent layer. The cords of all layers are disposed in two directions with respect to the mid-circumferential plane of the tire.

Figure 4:
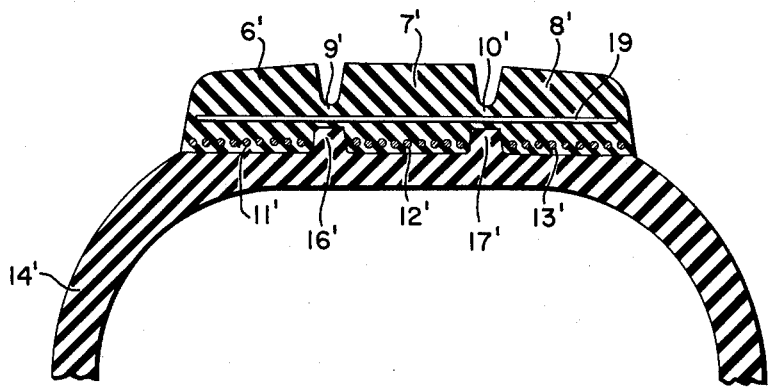
FIGURE 4 is a cross-sectional view similar to FIGURE 3 showing a modification of the present invention.

FIGURE 4 is a modification of FIGURE 3 and is described as follows:

Tread rings 6', 7' and 8' are interconnected by rubber bridges 9' and 10'. Inextensible reinforcing structures 11', 12' and 13' are provided as in the case of FIGURE 3; however, the separate tread construction of FIGURE 4 is provided with a reinforcing layer 19 comprising cords parallel to one another and lying substantially in radial planes.

When the reinforcing layer 19 is provided as shown in FIGURE 4, the lateral rings 6' and 8' are firmly connected to the central ring 7' as regards their relative position in transverse direction; consequently, the lateral longitudinal ridges (15 and 18 of FIGURE 3) can be eliminated; thus, the longitudinal ridges 16' and 17' of the carcass 14', cooperating with the bridges 9' and 10', will accomplish the same result as the structure shown in FIGURE 3.

It should be evident, therefore, that the tire construction of the present invention will retain the basic advantages afforded by the tire disclosed in Patent No. 2,990,867 while, at the same time, avoiding the possibility of tread misalignment as shown in FIGURE 2 herein.

Whereas the present invention has been described in particular relation to the drawings attached hereto, it should be understood that other and further modificaions, apart from those shown or suggested herein, may be made within the spirit and scope of this invention.

What is claimed is:

1. In a pneumatic tire comprising a carcass in which the cords of the carcass plies are disposed substantially radially of the tire, a plurality of longitudinal ridges on the outer periphery of said carcass and forming longitudinal grooves, and a plurality of longitudinally inextensible tread rings each having an annular reinforcing structure disposed in close proximity to its radially innermost portion, said rings being received within said grooves and placed under tension by the inner inflation pressure of the tire, the improvement which comprises annular bridges integrally connecting adjacent tread rings and being superimposed on the longitudinal ridges of the carcass and being made of the same material as said rings.

2. A separate tread structure for a pneumatic tire comprising a plurality of rings each provided in close proximity to its radially innermost portion with a reinforcing structure which is substantially inextensible in the longitudinal direction, and annular bridges integrally connecting the adjacent rings to one another and being made of the same material as said rings.

3. In a pneumatic tire comprising a carcass in which the cords of the carcass plies are disposed substantially radially of the tire, a plurality of longitudinal ridges on the outer periphery of said carcass and forming longitudinal grooves, and a plurality of longitudinally inextensible tread rings each having an annular reinforcing structure disposed in close proximity to its radially innermost portion, said rings being received within said grooves and placed under tension by the inner inflation pressure of the tire, the improvement which comprises annular bridges integrally connecting adjacent tread rings and being superimposed on the longitudinal ridges of the carcass and being made of the same material as said rings, and at least one reinforcing layer comprising cords parallel to one another and lying in substantially radial planes, said layer passing transversely through said tread rings and through said annular bridges and extending for the entire width of the resulting tread structure.

4. A separate tread structure for a pneumatic tire comprising a plurality of rings each provided in close proximity to its radially innermost portion with a reinforcing structure which is substantially inextensible in the longitudinal direction, and annular bridges integrally connecting the adjacent rings to one another and being made of the same material as said rings, and a reinforcing layer comprising cords parallel to one another and lying in substantially radial planes, said layer extending transversely through said tread rings and through said annular bridges.

References Cited in the file of this patent

UNITED STATES PATENTS

| | | |
|---|---|---|
| 2,609,026 | Luchsinger-Caballero | Sept. 2, 1952 |
| 2,990,867 | Barassi | July 4, 1961 |